United States Patent [19]

Sun et al.

[11] Patent Number: 4,538,196
[45] Date of Patent: Aug. 27, 1985

[54] PROTECTIVE RELAY APPARATUS AND METHOD FOR PROVIDING SINGLE-POLE TRIPPING

[75] Inventors: Shan C. Sun; James P. Garitty, both of Coral Springs, Fla.

[73] Assignee: Westinghouse Electric Corp., Pittsburgh, Pa.

[21] Appl. No.: 487,480

[22] Filed: Apr. 22, 1983

[51] Int. Cl.³ .............................................. H02H 3/30
[52] U.S. Cl. ...................................... 361/64; 361/66; 361/68; 361/81
[58] Field of Search ..................... 361/81, 80, 87, 82, 361/84, 64, 66, 68; 381/80, 81, 119; 179/18 RC, 1.5 E; 340/696, 349, 355, 825.77, 825.36, 825.37; 370/119, 32

[56] References Cited

U.S. PATENT DOCUMENTS

| | | | |
|---|---|---|---|
| 3,590,368 | 6/1971 | Esclangon | 361/68 X |
| 4,275,429 | 6/1981 | Church et al. | 361/76 X |
| 4,317,151 | 2/1982 | de Mesmaeker et al. | 361/81 X |
| 4,464,697 | 8/1984 | Sun | 361/68 X |

Primary Examiner—Reinhard J. Eisenzopf
Attorney, Agent, or Firm—William E. Zitelli

[57] ABSTRACT

A new protective relay for determining the occurrence of a single-phase-to-ground fault and tripping the appropriate circuit breaker. At local and remote terminals of a protected line segment, three signals representative of an electrical parameter on each phase conductor are input to a local and remote protective relay. In both the local and remote protective relays, the three electrical parameter signals are manipulated to produce two evaluation signals. The two local evaluation signals produced in the local protective relay are transmitted to the remote protective relay, and the two remote evaluation signals produced in the remote protective relay are transmitted to the local protective relay. In the local protective relay the two local evaluation signals are manipulated to produce a third local evaluation signal, and the two remote evaluation signals are manipulated to produce a third remote evaluation signal. The six evaluation signals are vectorially-compared to determine on which phase the fault has occurred. Only the circuit interrupter associated with the faulted phase conductor is tripped. If a fault involves two or more phase conductors, all three circuit interrupters are tripped. Similar signal processing occurs in the remote protective relay.

38 Claims, 3 Drawing Figures

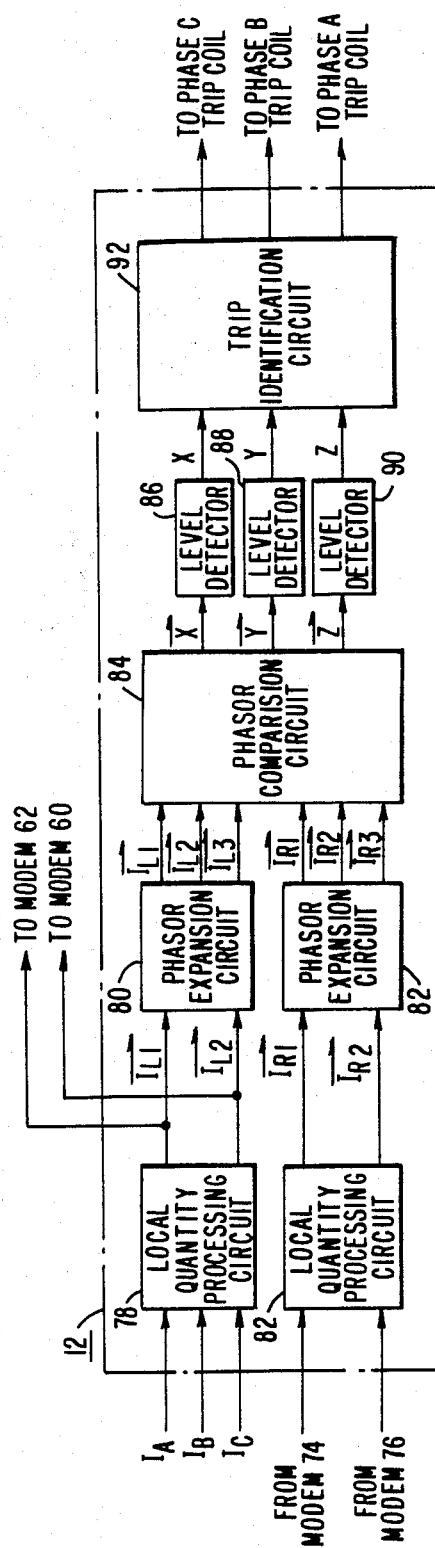

PROTECTIVE RELAY APPARATUS AND METHOD FOR PROVIDING SINGLE-POLE TRIPPING

BACKGROUND OF THE INVENTION

1. Field of the Invention

This invention relates generally to protective relay apparatus and methods for protecting ac electrical power transmission lines, and more specifically, to protective relay apparatus and methods providing single-pole tripping of a faulted phase conductor.

2. Description of the Prior Art

Three-phase ac electrical power transmission lines and power generating equipment must be protected against insulation faults and consequent short circuits or drops in shunt resistance that could cause collapse of the power system, serious and expensive apparatus damage, and personal injury. For instance, such a fault condition is caused by lighting-induced flashover from a transmission line to ground or between adjacent transmission line conductors. Under such a faulted condition, line currents can increase to several times the normal value, thereby causing loss of synchronism among generators and damaging or destroying both the transmission line and the attached equipment. To avoid equipment damage and collapse of the entire power system, faulted apparatus on the main transmission line must be isolated from the network in 0.1 to 0.5 seconds. The isolation time limit must allow for the operation of large circuit breakers interrupting up to 80,000 A and completion of back-up operations if these primary protective devices fail to function properly. To allow sufficient time for circuit interruption, location of the fault must be determined in approximately 8 ms to 20 ms. It is the function of the protective relays, which continuously monitor ac voltages and/or currents, to locate line faults and initiate isolation via tripping of the appropriate circuit breakers.

Most faults on three-phase ac electrical power transmission lines are transient single-phase-to-ground faults. Conventionally, such a fault is cleared by three-pole tripping followed by high-speed reclosing. Alternatively, the fault can be cleared by clearing only the faulted phase (i.e., single-pole tripping) followed by high speed reclosing. Use of single-pole tripping enables synchronizing power to be exchanged between the other two non-faulted phase conductors and minimizes system shock, ensuring a greater degree of stability. A large generation plant, for example, connected to the electrical power system via a single transmission line retains synchronization when single-pole tripping is used. Three-pole tripping requires the power generating machines to be resynchronized before reconnection to the system.

Two protective relays located at opposite bus terminals of an ac electrical power transmission line define a protected line segment. For single-pole tripping, the two protective relays, operating in communication with each other, must be able to distinguish a single-phase-to-ground fault from a phase-to-phase fault, a double-phase-to-ground fault, and three-phase faults, and must correctly identify the faulted phase. Several techniques are available for providing single-pole tripping, including: evaluation of the zero and negative sequence currents in a pilot relaying scheme; traveling-wave evaluation (see U.S. patent application Ser. No. 404,170, filed Aug. 2, 1982 now U.S. Pat. No. 4,438,475, and assigned to the assignee of the present invention), and segregated phase comparison.

As is well known in the art, to provide single-pole tripping with a phase comparison scheme, three system parameters must be identified by each protective relay and transmitted to the protective relay at the other end of the protected line segment. Thus, six modems are required. One novel feature of the present invention is the reduction of the required number of modems from six to four. This and other advantages of the present invention are discussed below in the DESCRIPTION OF THE PREFERRED EMBODIMENTS.

SUMMARY OF THE INVENTION

A protective relay apparatus and method for determining the faulted phase conductor of an ac electrical power transmission line is disclosed. The protective relay measures the voltage, current, or power on each phase conductor at a local terminal of a protected line segment. Three signals representing the voltage, current, or power on each phase conductor are produced and manipulated to form two local evaluation signals for evaluation by the local protective relay and for transmission to a remote protective relay. The local protective relay receives two remote evaluation signals from the remote protective relay. These remote evaluation signals are produced in a manner similar to the local evaluation signals. In the local protective relay, the two remote evaluation signals are manipulated to produce a third remote evaluation signal, and the two local evaluation signals are manipulated to produce a third local evaluation signal. The three local evaluation signals and the three remote evaluation signals are phase compared to determine the phase relation between the local and remote evaluation signals for each phase conductor. The three signals resulting from the phase comparison are then expressed as logic functions. The logic state of the three phase comparison signals is checked to determine if a single-phase fault has occurred and to identify the faulted phase conductor. Alternatively, if more than one phase conductor is faulted, the protective relay initiates three-pole tripping.

Since only two signals are transmitted from the remote to the local protective relay (and vice versa) only four modems, two at each relay, are required. Six modems are required in the prior art. Reduction of the number of modems also simplifies installation, calibration, and testing.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 2 is a block diagram of a protective relay constructed according to the teachings of the present invention; and FIG. 3 is a truth table for the protective relay of FIG. 2.

DESCRIPTION OF THE PREFERRED EMBODIMENTS

Figure 1:
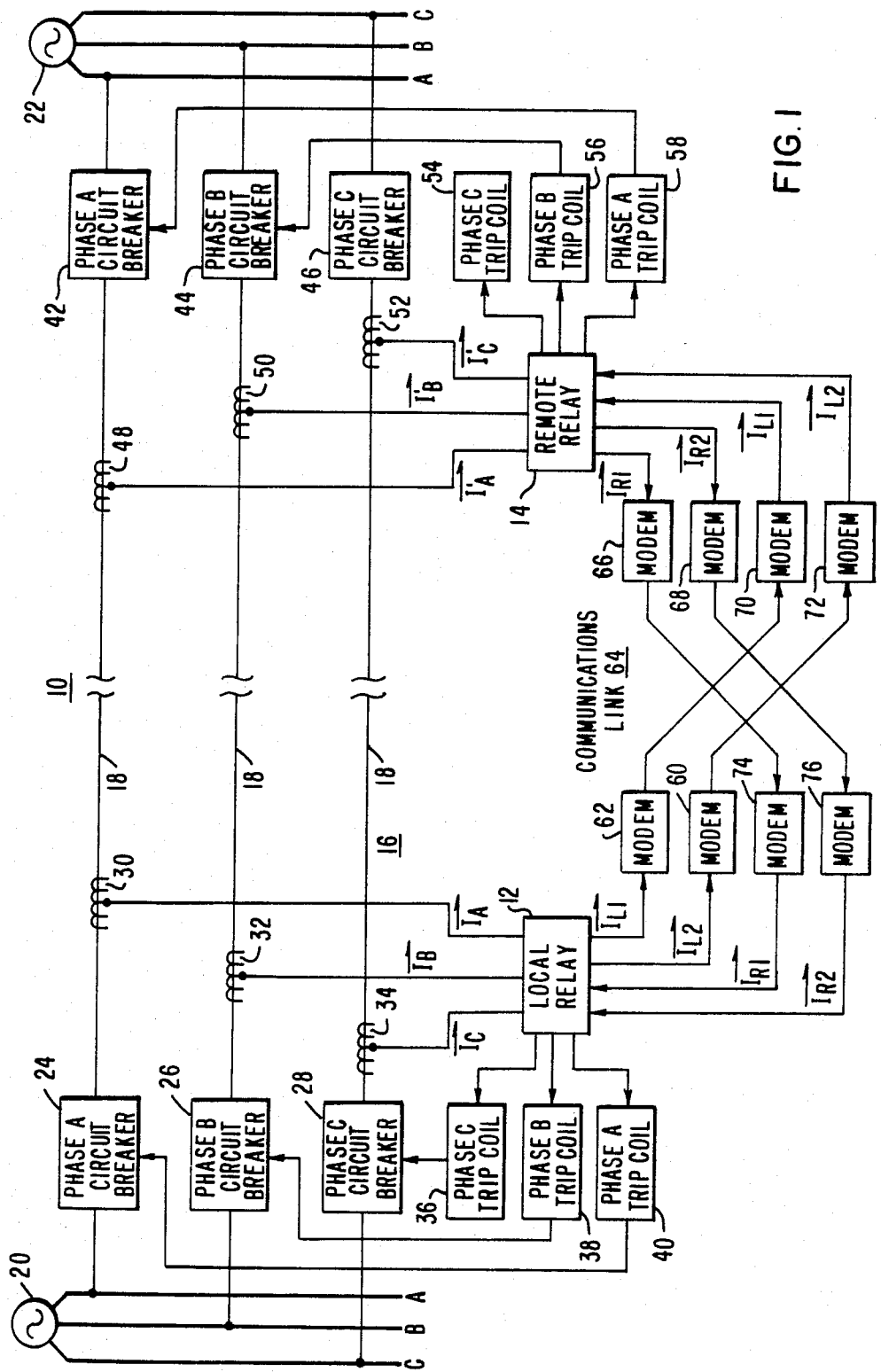
FIG. 1 is a block diagram of a protective relaying scheme using a local and a remote protective relay to protect an intervening protected line segment.

In FIG. 1 there is shown a block diagram of a protective relaying system 10 employing a local relay 12 and a remote relay 14 constructed according to the teachings of the present invention. A protected line segment 18 of the three-phase ac electrical power transmission system 16 is protected by the local relay 12 and the remote relay 14. The local relay 12 is located at a local terminal of the protected line segment 18 and the remote relay 14 is located at a remote terminal thereof.

Specifically, the three-phase ac electrical power transmission system 16 includes ac sources 20 and 22 for producing an ac electrical power signal having a frequency of 50 Hz or 60 Hz. The ac source 20 is connected to a phase A conductor of the three-phase AC electrical power transmission line system 16 via a phase A circuit breaker 24, to a phase B conductor via a phase B circuit breaker 26, and to a phase C conductor via a phase C circuit breaker 28. The ac source 22 is connected to the phase A conductor of the three-phase ac electrical power transmission line system 16 via a phase A circuit breaker 42, to the phase B conductor via a phase B circuit breaker 44, and to the phase C conductor via a phase C circuit breaker 46.

At the local terminal of the protected line segment 18, a current transformer 30 produces a signal $I_A$ that is representative of the current at the local terminal on the phase A conductor. The local relay 12 is responsive to the signal $I_A$ at a first input terminal thereof. A current transformer 32 produces a signal $I_B$ that is representative of the current flowing on the phase B conductor at the local terminal. The local relay 12 is responsive to the signal $I_B$ at a second input terminal thereof. A current transformer 34 produces a signal $I_C$ that is representative of the current flowing on the phase C conductor at the local terminal. The local relay 12 is responsive to the signal $I_C$ at a third input terminal thereof. Similarly, current transformers 48, 50, and 52 produce signals $I'_A$, $I'_B$, and $I'_C$, respectively, representing the current on the respective phase conductors at the remote terminal of the protected line segment 18. The remote relay 14 is responsive to the signals $I'_A$, $I'_B$, and $I'_C$, at first, second, and third input terminals, respectively, thereof.

When a fault is located on the phase A conductor of the protected line segment 18 (as will be discussed in detail subsequently), the local relay 12, via a first output terminal thereof, provides a trip signal to energize a phase A trip coil 40. The phase A trip coil 40 opens the phase A circuit breaker 24 to remove the phase A conductor from service. When a fault is located on phase B of the protected line segment 18, local relay 12, via a second output terminal thereof, provides a trip signal to energize a phase B trip coil 48. The phase B trip coil 48 opens the phase B circuit breaker 26. When a fault is located on the phase C conductor of the protected line segment 18, the local relay 12, via a third output terminal thereof, provides a trip signal to energize a phase C trip coil 36. The phase C trip coil 36 opens the phase C circuit breaker 28. In a similar manner, the remote relay 14 provides signals to a phase A trip coil 58, a phase B trip coil 56, and a phase C trip coil 54, to trip the phase A circuit breaker 42, the phase B circuit breaker 44, and the phase C circuit breaker 46, respectively.

To determine whether the fault is located on the protected line segment 16, the local relay 12, and the remote relay 14 must communicate with each other. As will be discussed in more detail later, the local relay 12 produces two phasor quantity signals designated $I_{L1}$ and $I_{L2}$. The signal $I_{L1}$ is input to a modem 62, where the signal $I_{L1}$ is modulated for transmission to the remote terminal via a communications link 64. At the remote terminal the signal $I_{L1}$ is demodulated in a modem 70 and then input to the remote relay 14. The signal $I_{L2}$ from the local relay 12 is input to a modem 60, propagated over the communications link 64, and received by a modem 72 at the remote terminal. The signal $I_{L2}$ is then input to the remote relay 14.

At the remote relay 14 signals $I_{R1}$ and $I_{R2}$ are produced. The signals $I_{R1}$ is input to a modem 66 and the signal $I_{R2}$ is input to a modem 68. After modulation in the respective modem, the signals $I_{R1}$ and $I_{R2}$ are propagated over the communications link 64 and received by the modems 74 and 76, respectively. The signals $I_{R1}$ and $I_{R2}$ are then input to the local relay 12 to determine the fault location.

Turning to FIG. 2, there is shown in block diagram form, details of the local relay 12. The remote relay 14 is identical in function and construction to the local relay 12 and therefore will not be discussed further.

The signals $I_A$, $I_B$, and $I_C$ from the current transformers 30, 32, and 34, respectively, are input to a local quantity processing circuit 78 as shown in FIG. 2. In the local quantity processing circuit 78, signals $I_{L1}$ and $I_{L2}$ are produced according to the equations below:

$$I_{L1} = I_A - I_B$$

$$I_{L2} = I_B - I_C$$

As indicated in FIG. 2, the signals $I_{L1}$ and $I_{L2}$ are input to, respectively, modems 62 and 60 for transmission to the modems at the receiving end via the communications link 64 shown on FIG. 1. The signals $I_{L1}$ and $I_{L2}$ are also input to a phasor expansion circuit 80 wherein a signal $I_{L3}$ is produced according to the equation below:

$$I_{L3} = I_{L1} + I_{L2}$$

$$I_{L3} = I_A - I_C$$

In the remote relay 14, signals $I_{R1}$ and $I_{R2}$ are produced from the current signals $I'_A$, $I'_B$, and $I'_C$ in a remote quantity processing circuit similar in function and construction to the local quantity processing circuit 78 illustrated in FIG. 2. The signals $I_{R1}$ and $I_{R2}$ are transmitted to the local relay 12 and input to a phasor expansion circuit 82 shown in FIG. 2. Using the signals $I_{R1}$ and $I_{R2}$, the phasor expansion circuit 82 produces a third signal, $I_{R3}$. The signal $I_{R3}$ produced in the phasor expansion circuit 82 is generated according to the following equation:

$$I_{R3} = I_{R1} + I_{R2}$$

$$I_{R3} = I'_A - I'_C$$

Therefore, only two signals must be transmitted from the remote relay 14 to the local relay 12 via the communications link 64. This novel feature of the present invention reduces the amount of hardware necessary for the relay installation, i.e., the number of modems. Also, installation, calibration, and testing time are shortened due to the hardware reduction.

In a phasor-comparison circuit 84, the signals $I_{L1}$, $I_{L2}$, and $I_{L3}$, are vectorially compared with, respectively, the signals $I_{R1}$, $I_{R2}$, and $I_{R3}$ according to the equations below:

$$X = I_{L1} - I_{R1}$$

$$Y = I_{L2} - I_{R2}$$

$$Z = I_{L3} - I_{R3}$$

Note that for ideal non-fault condition, the signals $I_{L1}$ and $I_{R1}$ are 180° out-of-phase and, therefore, the signal X has a maximum value. Under internal fault conditions, when the signals $I_{L1}$ and $I_{R1}$ are exactly in-phase, the singal X has a zero magnitude. These same conditions apply for the signals Y and Z. The signal X is input to a level detector 86; the signal Y is input to a level detector 88; and the signal Z is input to a level detector 90. When the signal X input to the level detector 86 exceeds a predetermined value, the output signal X from the level detector 86 has a logic one value. A logic one indicates an internal fault condition. When the signal X does not exceed the predetermined level of the level detector 86, the output signal X has a logic zero level. The level detectors 88 and 90 function in a similar manner with respect to the signals Y, Y, Z, and Z. Further details of the phase comparison process and the level detection process can be found in U.S. Pat. No. 4,275,429 and U.S. patent application Ser. No. 339,031 (filed Jan. 13, 1982) both of which are assigned to the assignee of the present invention.

The output signals X, Y, and Z are input to a trip identification circuit 92 for identifying the faulted phase conductor. The trip identification circuit 92 essentially implements the truth table shown in FIG. 3.

Turning to FIG. 3, it is shown that when the signals X and Z are logic one and the signal Y is logic zero, a single-phase internal fault has occurred on phase conductor A. When the signals X and Y are a logic one and the signal Z is logic zero, a single-phase internal fault has occurred on phase conductor B. Lastly, when the signals Y and Z are logic one and the signal X is logic zero, a single-phase internal fault has occurred on the phase C conductor. As shown in FIG. 2, the trip identification circuit 92 provides a signal to the phase A trip coil 40, the phase B trip coil 38, and the phase C trip coil 36 in accord with the truth table of FIG. 3. Note also that when all of the signals X, Y, and Z are logic one, it signifies internal phase-to-phase faults, phase-to-phase-to-ground faults, and three-phase faults. Therefore, under this condition, the trip identification circuit 92 provides a three-phase trip. Note that the invention is deliberately ignoring external faults.

Although the invention has been described herein in terms of current transformers providing current signals, the present invention can also be used with voltage transformers providing voltage signals to the local relay 12 and the remote relay 14. Alternatively, the power flowing in the protected line segment 18 can be monitored and this information provided to the local relay 12 and the remote relay 14.

In addition to the above-described protective relay apparatus, the present invention also consists of a method of determining whether a single-phase fault has occurred on a protected line segment of a three-phase ac electrical power transmission system. Three signals related to the current, voltage, or power on the protected line segment at a local and remote terminal thereof are provided. A process is disclosed for manipulating these three signals to produce two signals for evaluation and transmittal to the protective relay at the other protected line segment terminal. At both the local and remote terminals the two evaluation signals are manipulated in a novel way to produce a third evaluation signal. The phase relation of the three local evaluation signals is compared with the three remote evaluation signals. Depending on the magnitude of the phasor difference between the respective evaluation signals, a determination can be made whether a fault has occurred on a single phase conductor.

What is claimed is:

1. A phasor-comparison protective-relay system detecting the faulted phase conductor of a three-phase ac transmission line section having a circuit interrupter on each of the first, second, and third phase conductors at each of the local and remote terminals thereof, said phasor-comparison protective-relay system comprising:

means at each of the local and remote terminals responsive to first, second, and third electrical parameters thereat for providing first and second local derived signals at the local terminal, and first and second remote derived signals at the remote terminal;

means at each of the local and remote terminals for transmitting said first and second local derived signals to the remote terminal and for transmitting said first and second remote derived signals to the local terminal;

means at each of the local and remote terminals for expanding said first and second derived signals received from the other into first, second, and third local comparison signals at the local terminal and first, second, and third remote comparison signals at the remote terminal;

and comparator means at each of the local and remote terminals for logically relating said first, second, and third local comparison signals at the local terminal and said first, second, and third remote comparison signals at the remote terminal to detect the faulted phase conductor and for tripping the circuit interrupter on the faulted phase conductor at each of the local and remote terminals.

2. The phasor-comparison protective relay system of claim 1 wherein the first, second, and third electrical parameters represent voltages.

3. The phasor-comparison protective relay system of claim 1 wherein the first, second, and third electrical parameters represent currents.

4. The phasor-comparison protective relay system of claim 1 wherein the first, second, and third electrical parameters represent power.

5. The phasor-comparison protective relay system of claim 1 wherein the first local derived signal represents the phasor difference of the first and second electrical parameters at the local terminal, and the second local derived signal represents the phasor difference of the second and third electrical parameters at the local terminal, and wherein the first remote derived signal represents the phasor difference of the first and second electrical parameters at the remote terminal and the second remote derived signal represents the phasor difference of the second and third electrical parameters at the remote terminal.

6. The phasor-comparison protective relay system of claim 1 including a third local derived signal, wherein said third local derived signal is the phasor sum of the first and second local derived signals.

7. The phasor-comparison protective relay system of claim 6 including a third remote derived signal wherein said third remote derived signal is the phasor sum of the first and second remote derived signals.

8. The phasor-comparison protective relay system of claim 7 including means at each of the local and remote terminals for vectorially relating the first, second, and third local derived signals with, respectively, the first, second, and third remote derived signals and for producing the first, second, and third local comparison signals at the local terminal and for producing the first, second, and third remote comparison signals at the remote terminal.

9. The phasor-comparison protective relay system of claim 8 wherein the first local and first remote comparison signals are the phasor difference of the first local derived signal and the first remote derived signal, and wherein the second local and second remote comparison signals are the phasor difference of the second local derived signal and the second remote derived signal, and wherein the third local and third remote comparison signals are the phasor difference of the third local derived signal and the third remote derived signal.

10. The phasor-comparison protective relay system of claim 1 wherein the comparator means at the local terminal includes:
first level detector means for producing a first local logic signal having a first state when the first local comparison signal is greater than a predetermined value and having a second state when the first local comparison signal is less than said predetermined value;
second level detector means for producing a second local logic signal having a first state when the second local comparison signal is greater than a predetermined value and having a second state when the second local comparison signal is less than said predetermined value;
third level detector means for producing a third local logic signal having a first state when the third local comparison signal is greater than a predetermined value and having a second state when the third local comparison signal is less than said predetermined value;
and evaluation means for evaluating said first, second, and third local logic signals for producing a first local trip signal if the first phase conductor is faulted to ground, for producing a second local trip signal if the second phase conductor is faulted to ground, for producing a third local trip signal if the third phase conductor is faulted to ground, and for producing a fourth local trip signal if said phasor comparison protective relay system is unable to determine on which phase conductor the fault is located, wherein said first local trip signal opens the circuit interrupter at the local terminal on the first phase conductor, wherein said second local trip signal opens the circuit interrupter at the local terminal on the second phase conductor, wherein said third local trip signal opens the circuit interrupter at the local terminal on the third phase conductor, and wherein said fourth local trip signal opens the circuit interrupters at the local terminal on the first, second, and third phase conductors.

11. The phasor-comparison protective relay system of claim 10 wherein the first local trip signal is produced when the first and third local logic signals are in the first state and the second local logic signal is in the second state.

12. The phasor-comparison protective relay system of claim 10 wherein the second local trip signal is produced when the first and second local logic signals are in the first state and the third local logic signal is in the second state.

13. The phasor-comparison protective relay system of claim 10 wherein the third local trip signal is produced when the second and third local logic signals are in the first state and the first local logic signal is in the second state.

14. The phasor-comparison protective relay system of claim 10 wherein the fourth local trip signal is produced when the first, second, and third local logic signals are in the first state.

15. The phasor-comparison protective relay system of claim 1 wherein the comparator means at the remote terminal includes:
first level detector means for producing a first remote logic signal having a first state when the first remote comparison signal is greater than a predetermined value and having a second state when the first remote comparison signal is less than said predetermined value;
second level detector means for producing a second remote logic signal having a first state when the second remote comparison signal is greater than a predetermined value and having a second state when the second remote comparison signal is less than said predetermined value;
third level detector means for producing a third remote logic signal having a first state when the third remote comparison signal is greater than a predetermined value and having a second state when the third remote comparison signal is less than said predetermined value;
and evaluation means for evaluating the first, second, and third remote logic signals for producing a first remote trip signal if the first phase conductor is faulted to ground, for producing a second remote trip signal if the second phase conductor is faulted to ground, for producing a third remote trip signal if the third phase conductor is faulted to ground, and for producing a fourth remote trip signal if said phasor comparison protective relay system is unable to determine on which phase conductor the fault is located, wherein said first remote trip signal opens the circuit interrupter at the remote terminal on the first phase conductor, wherein said second remote trip signal opens the circuit interrupter at the remote terminal on the second phase conductor, wherein said third remote trip signal opens the circuit interrupter at the remote terminal on the third phase conductor, and wherein said fourth remote trip signal opens the circuit interrupters at the remote terminal on the first, second, and third phase conductors.

16. The phasor-comparison protective relay system of claim 15 wherein the first remote trip signal is produced when the first and third remote logic signals are in the first state and the second remote logic signal is in the second state.

17. The phasor-comparison protective relay system of claim 15 wherein the second remote trip signal is produced when the first and second remote logic signals are in the first state and the third remote logic signal is in the second state.

18. The phasor-comparison protective relay system of claim 15 wherein the third remote trip signal is produced when the second and third remote logic signals are in the first state and the first remote logic signal is in the second state.

19. The phasor-comparison protective relay system of claim 15 wherein the fourth remote trip signal is produced when the first, second, and third remote logic signals are in the first state.

20. A phasor-comparison protective relay tripping a faulted conductor of a three-phase ac transmission line section having a circuit interrupter on each of a first, second, and third phase conductors at local and remote terminals thereof, wherein local circuit interrupters are controlled by said phasor-comparison protective relay at the local terminal and remote circuit interrupters are controlled by a remote protective relay located at the remote terminal, and wherein said phasor-comparison protective relay and the remote protective relay are in communication via a communications channel, and wherein the remote protective relay includes a remote receiver and a remote transmitter, and wherein the remote transmitter transmits a plurality of remote status signals to said phasor-comparison protective relay representative of the electrical status of the first, second, and third phase conductors at the remote terminal, said phasor-comparison protective relay comprising:
 means at the local terminal responsive to first, second, and third electrical parameters thereat for providing first and second local derived signals;
 local transmitter means for transmitting said first and second local derived signals to the remote receiver via the communications channel, wherein the remote protective relay is responsive to said first and second local derived signals for controlling the circuit interrupters at the remote end;
 local receiver means responsive to the plurality of remote status signals transmitted by the remote transmitter via the communications channel, for producing a plurality of received signals in response thereto;
 means reponsive to the plurality of received signals for producing first and second remote derived signals;
 means for expanding said first and second local derived signals and said first and second remote derived signals into first, second, and third comparison signals;
 comparator means for logically relating said first, second, and third comparison signals to detect the faulted phase conductor and for tripping the local circuit interrupter on the faulted phase conductor.

21. The phasor-comparison protective relay of claim 20 wherein the first, second, and third electrical parameters represent the voltages on, respectively, the first, second, and third phase conductors at the local terminal.

22. The phasor-comparison protective relay of claim 20 wherein the first, second, and third electrical parameters represent the currents on, respectively, the first, second, and third phase conductors at the local terminal.

23. The phasor-comparison protective relay of claim 20 wherein the first, second, and third electrical parameters represent the power on, respectively, the first, second, and third phase conductors at the local terminal.

24. The phasor-comparison protective relay of claim 20 wherein the first local derived signal represents the phasor difference of the first and second electrical parameters, and wherein the second local derived signal represents the phasor difference of the second and third electrical parameters.

25. The phasor-comparison protective relay of claim 20 including a third local derived signal, wherein said third local derived signal is the phasor sum of the first and second local derived signals.

26. The phasor-comparison protective relay of claim 25 wherein the first comparison signal is the phasor difference of the first local derived signal and the first remote derived signal, and wherein the second comparison signal is the phasor difference of the second local derived signal and the second remote derived signal, and wherein the third comparison signal is the phasor difference of the third local derived and the third remote derived signal.

27. The phasor comparison protective relay of claim 20 wherein the comparator means includes:
 first level detector means for producing a first logic signal having a first state when the first comparison signal is greater than a predetermined value and having a second state when the first comparison signal is less than said predetermined value;
 second level detector means for producing a second logic signal having a first state when the second comparison signal is greater than a predetermined value and having a second state when the second comparison signal is less than said predetermined value;
 third level detector means for producing a third logic signal having a first state when the third comparison signal is greater than a predetermined value and having a second state when the third logic signal is less than said predetermined value;
 and evaluation means for evaluating said first, second, and third logic signals for producing a first trip signal if the first phase conductor is faulted to ground, for producing a second trip signal if the second phase conductor is faulted to ground, for producing a third trip signal if the third phase conductor is faulted to ground, and for producing a fourth trip signal if said phasor comparison protective relay is unable to determine on which phase conductor the fault is located, wherein said first trip signal opens the circuit interrupter on the first phase conductor, wherein said second trip signal opens the circuit interrupter on the second phase conductor, wherein said third trip signal opens the circuit interrupter on the third phase conductor, and wherein said fourth trip signal opens the circuit interrupters on the first, second, and third phase conductors.

28. The phasor-comparison protective relay of claim 27 wherein the first trip signal is produced when the first and third logic signals are in the first state and the second logic signal is in the second state.

29. The phasor-comparison protective relay of claim 27 wherein the second trip signal is produced when the first and second logic signals are in the first state and the third logic signal is in the second state.

30. The phasor-comparison protective relay of claim 27 wherein the third trip signal is produced when the second and third logic signals are in the first state and the first logic signal is in the second state.

31. The phasor-comparison protective relay of claim 27 wherein the fourth trip signal is produced when the first, second, and third logic signals are in the first state.

32. A method for detecting the faulted phase conductor of a three-phase ac transmission line section having a circuit interrupter on each of the first, second, and third phase conductors at each of the local and remote terminals thereof, said method comprising the steps of:
providing first and second local derived signals representative of an electrical parameter of respectively the first, second, and third phase conductors at the local terminal;
providing first and second remote derived signals representative of an electrical parameter of respectively, the first, second, and third phase conductors at the remote terminal;
transmitting said first and second local derived signals to the remote terminal;
transmitting said first and second remote derived signals to the local terminal;
expanding said first and second local derived signals and said first and second remote derived signals into first, second, and third comparison signals at each of the local and remote terminals;
and logically relating said first, second, and third comparison signals at each of the local and remote terminals to detect the faulted phase conductor and tripping the circuit interrupter on the faulted phase conductor at each of the local and remote terminals.

33. The method of claim 32 wherein the step of providing the first and second local derived signals includes substracting the electrical parameter on the second phase conductor at the local terminal from the electrical parameter on the first phase conductor at the local terminal to produce the first local derived signal, and subtracting the electrical parameter on the third phase conductor at the local terminal from the electrical parameter on the second phase conductor at the local terminal to produce the second local derived signal.

34. The method of claim 32 wherein the step of providing the first and second remote derived signals includes subtracting the electrical parameter on the second phase conductor at the remote terminal from the electrical parameter on the first phase conductor at the remote terminal to produce the first remote derived signal, and subtracting the electrical parameter on the third phase conductor at the remote terminal from the electrical parameter on the second phase conductor at the remote terminal to produce the second remote derived signal.

35. The method of claim 32 wherein the step of expanding the first and second local derived signals includes adding the first and second local derived signals to produce a third local derived signal at each of the local and remote terminals.

36. The method of claim 35 wherein the step of expanding the first and second remote derived signals includes adding the first and second remote derived signals to produce a third remote derived signal at each of the local and remote terminals.

37. The method of claim 36 wherein the step of logically relating the first, second, and third comparison signals at each of the local and remote terminals includes vectorially substracting the first remote derived signal from the first local derived signal to produce the first comparison signal at each of the local and remote terminals, vectorially subtracting the second remote derived signal from the second local derived signal to produce the second comparison signal at each of the local and remote terminals, and vectorially subtracting the third remote derived signal from the third local derived signal to produce the third comparison signal at each of the local and remote terminals.

38. The method of claim 37 wherein the step of logically relating the first, second, and third comparison signals at each of the local and remote terminals includes:
producing a first logic signal at each of the local and remote terminals having a first state when the first comparison signal at each of the local and remote terminals is greater than a predetermined value and having a second state when the first comparison signal is less than said predetermined value;
producing a second logic signal at each of the local and remote terminals having a first state when the second comparison signal at each of the local and remote terminals is greater than a predetermined value, and having a second state when the first comparison signal is less than said predetermined value;
producing a third logic signal at each of the local and remote terminals having a first state when the third comparison signal at each of the local and remote terminals is greater than a predetermined value, and having a second state when the third comparison signal is less than said predetermined value;
and evaluating said first, second, and third logic signals at each of the local and remote terminals to produce a first trip signal at each of the local and remote terminals when said first and third logic signals are in the first state and said second logic signal is in the second state, to produce a second trip signal at each of the local and remote terminals when said first and second logic signals are in the first state and said third logic signal is in the second state, to produce a third trip signal at each of the local and remote terminals when said second and third logic signals are in the first state and said first logic signal is in the second state, and to produce a fourth trip signal when said first, second, and third logic signals are in the first state, wherein said first trip signal opens the circuit interrupter at each of the local and remote terminals on the first phase conductor, and wherein said second trip signal opens the circuit interrupter at each of the local and remote terminals on the second phase conductor, and wherein said third trip signal opens the circuit interrupter at each of the local and remote terminals on the third phase conductor, and wherein said fourth trip signal opens the circuit interrupters at each of the local and remote terminals on the first, second, and third phase conductors.

* * * * *